United States Patent
Cho et al.

(10) Patent No.: US 8,225,236 B2
(45) Date of Patent: Jul. 17, 2012

(54) DISPLAYING ACTIVE CURSOR IN MOBILE TERMINAL

(75) Inventors: Hyeyoun Cho, Seoul (KR); Huhn Kim, Seoul (KR); Sang Yeon Lim, Seoul (KR); Hoi Chul Kim, Seoul (KR); Kyu Dae Shim, Seoul (KR); Jae Pil Park, Seoul (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 12/103,981

(22) Filed: Apr. 16, 2008

(65) Prior Publication Data

US 2008/0256477 A1 Oct. 16, 2008

(30) Foreign Application Priority Data

Apr. 16, 2007 (KR) .................. 10-2007-0036757

(51) Int. Cl.
*G06F 3/048* (2006.01)
(52) U.S. Cl. .................. 715/859; 715/821; 715/861
(58) Field of Classification Search .................. 715/810, 715/811, 821, 823, 825, 835, 856–861, 864
See application file for complete search history.

(56) References Cited

U.S. PATENT DOCUMENTS

| | | | |
|---|---|---|---|
| 7,493,573 B2 * | 2/2009 | Wagner | 715/864 |
| 2006/0031784 A1 * | 2/2006 | Makela | 715/850 |
| 2006/0031785 A1 * | 2/2006 | Raciborski | 715/859 |
| 2006/0107227 A1 * | 5/2006 | Kiljander | 715/772 |
| 2008/0026690 A1 | 1/2008 | Foxenland | |

FOREIGN PATENT DOCUMENTS

| | | |
|---|---|---|
| CN | 1925652 | 3/2007 |
| EP | 1761008 | 3/2007 |
| WO | WO 2004/044727 | 5/2004 |

* cited by examiner

*Primary Examiner* — Robert Stevens
*Assistant Examiner* — Andrew Tank
(74) *Attorney, Agent, or Firm* — Lee, Hong, Degerman, Kang & Waimey

(57) ABSTRACT

A mobile communication terminal and a method of multi-tasking in the terminal are provided. The mobile communication terminal displays a first task display associated with a first application task, receives a request to execute a second application task while the first application task is being performed, and displays a second task display associated with the second application task, wherein the second task display at least partially replaces the first task display, at least a portion of the second task display is identified by an active cursor configured to allow a user to select a function associated with the second application task, and at least one display feature of the active cursor indicates that the first application task is being concurrently performed.

17 Claims, 6 Drawing Sheets

DISPLAYING ACTIVE CURSOR IN MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2007-0036757, filed on Apr. 16, 2007, the contents of which are hereby incorporated by reference herein in their entirety.

FIELD OF THE INVENTION

The present invention is directed to multi-tasking and displaying an active cursor in a mobile terminal.

DESCRIPTION OF THE RELATED ART

Recently, a mobile terminal has been developed to achieve a high processing speed and a high memory capacity to support multitask operations. The mobile terminal with multitask capability processes and displays a most recently executed application on top of a display or in a foreground while processing and displaying other executed applications previously initiated in a background. The mobile terminal with multitask capability displays, for example, a Background Music (BGM) indicator to indicate that an MPEG-1 Audio layer 3 (MP3) file is being reproduced in the background when another application is being executed in the foreground.

SUMMARY OF THE INVENTION

In one general aspect, a method of multi-tasking in a mobile terminal includes displaying a first task display associated with a first application task in the mobile terminal, receiving a request to execute a second application task while the first application task is being performed, and displaying a second task display, the second task display associated with the second application task and at least partially replacing the first task display, wherein at least a portion of the second task display is identified by an active cursor configured to allow a user to select a function associated with the second application task and at least one display feature of the active cursor indicates that the first application task is concurrently being performed.

In one embodiment, the second task display includes a menu list corresponding to the second application task, at least one item of the menu list identified by the active cursor. The display feature of the active cursor may include at least one of color, color tone and fading. Additionally, the display feature of the active cursor may include at least one of still and moving images.

In another embodiment, the first application task includes an MP3 file reproduction function and the moving images move in response to a tempo of music played via the MP3 file reproduction function.

In another embodiment, the active cursor includes at least one additional display feature that corresponds to at least one additional application task being performed concurrently with the first and the second application tasks. The additional display feature may be selectively determined by the user.

Preferably, the active cursor includes status information associated with the first application task. The status information may include one of text information and a progressive bar graph. The display feature of the active cursor may be initiated a predetermined time after displaying the second task display.

In another aspect, a terminal includes an input unit for receiving a request to perform a first application task and a request to perform a second application task, the request to perform the second application task received while the first application task is being performed; a display for displaying a first task display associated with the first application task and a second task display associated with the second application task, the second task display at least partially replacing the first task display; and a controller for displaying an active cursor on the second task display, wherein at least one display feature of the active cursor indicates that the first application task is being concurrently performed.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
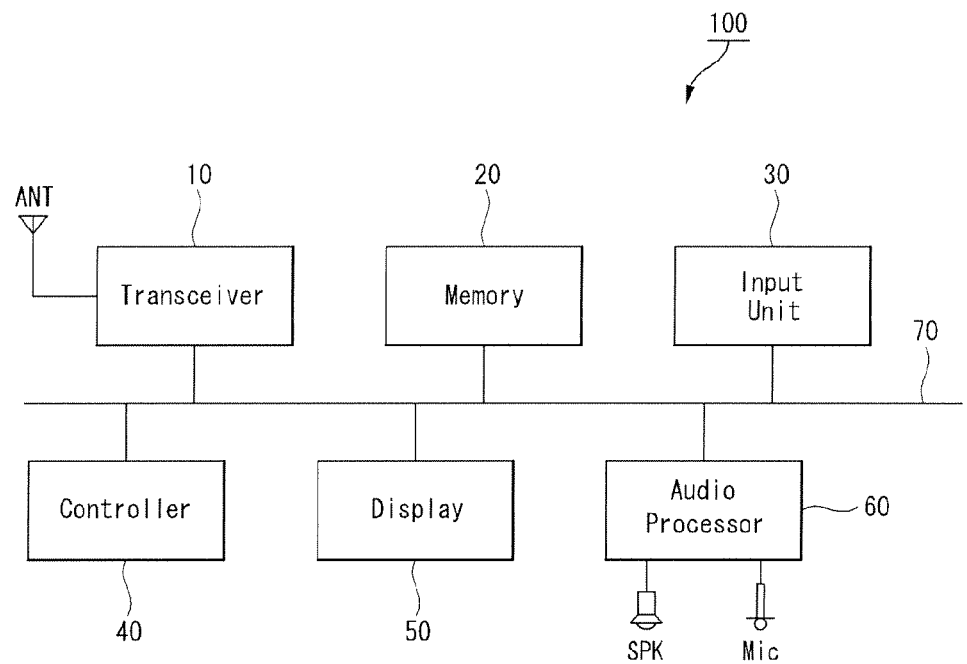
FIG. 1 is a block diagram illustrating an exemplary mobile communication terminal according to an embodiment of the present invention.

Referring to FIG. 1, a mobile communication terminal 100 according to the present invention includes a transceiver 10, a memory unit 20, an input unit 30, a controller 40, a display 50, and an audio processor 60.

The transceiver 10 transmits and receives signals to and from a base station (not shown) to perform a communication function for the mobile communication terminal 100.

The memory unit 20 stores programs and data for controlling overall operations of the mobile communication terminal 100. The memory unit 20 further stores files such as MP3 files, video files, and image files. The memory unit 20 may also store a program for a real-time operating system to support multitask operations of the mobile communication terminal 100.

The input unit 30 includes various buttons for inputting information such as numbers and characters. The input unit 30 further includes function buttons for manipulating various functions and direction buttons for selecting a specific direction to move a cursor. The input unit 30 is implemented as a key pad, a touchpad, a jog dial, a touch screen, or a joystick. The input unit 30 receives a command from a user to perform a specific task by transferring the input command to the controller 40.

The controller 40 is a processor that performs overall control operations of the mobile communication terminal 100 based on the programs and data stored in the memory unit 20. The controller 40 controls and manages the multitask operations using the program for the real-time operating system stored in the memory unit 20.

For example, the controller 40 manages to execute a plurality of tasks in parallel based on a priority preset according to factors such as their urgency and importance. The controller 40 receives a command to operate the specific task from the input unit 20 while operating another task such as reproducing or downloading certain contents.

Accordingly, the controller 40 performs multitask operations to perform the specific task in the foreground and display a screen related to the specific task on the display 50. The controller 40 also displays an active cursor on the screen related to the specific task in the foreground to visually indicate that another task is being performed in the background. For example, the active cursor may indicate that certain contents are being reproduced or downloaded in the background.

The display 50 displays on a screen a variety of information output from the mobile communication terminal 100. The screen may include a menu screen. The display 50 may include a Liquid Crystal Display (LCD) or an Organic Light Emitting Diode (OLED).

The display 50 may include more than one display devices, such as an external display device and an internal display device. The display 50 may display an active cursor under the control of the controller 40. The active cursor may display in its interior at least one graphic pattern such as a rhythmical motion.

The audio processor 60 processes audio signals decoded by the controller 40 to output specific sound through a speaker SPK under the control of the controller 40. The audio processor 60 further processes audio signals from a microphone MIC to transmit the processed audio signals to the controller 40.

Figure 2:
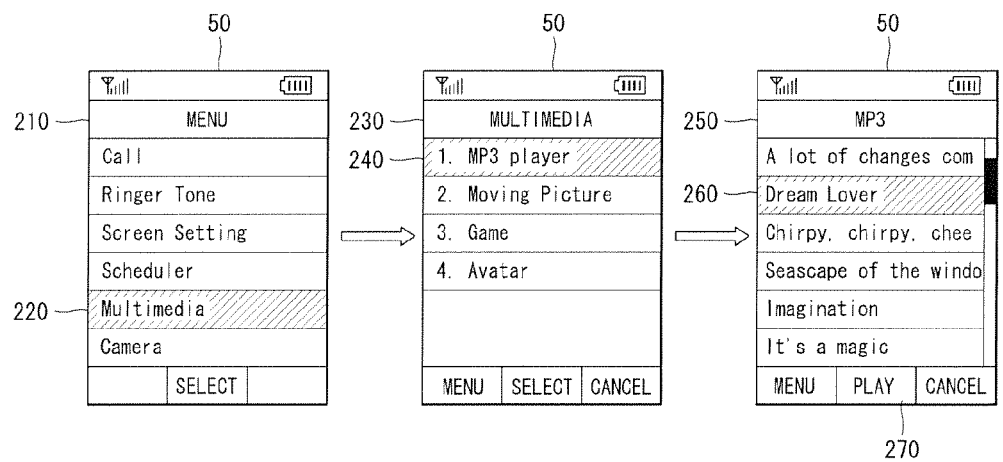
FIGS. 2 and 3 illustrate screens displaying cursors according to an embodiment of the present invention.

Referring to FIG. 2, cursors 220, 240, and 260 are shown on screens 210, 230, and 250, respectively, of the display 50 of the mobile communication terminal 100. A cursor generally refers to a pointer, a moving icon or position markers of the pointing device. In a graphical user interface as often used in the mobile communication terminal 100, the cursor is often a blinking line or bar that is used to indicate which submenu or item in a menu or list is selected by highlighting or distinguishing the selected submenu or item from other submenus or items. In general, the cursor is monotonous and displayed in a single solid color. In the present invention, an "active cursor" is distinguished from the common cursor and is characterized by changing colors, or graphic image/motion of waves or bubbles in the cursor.

In FIG. 2, a 'Multimedia' 220 is selected from an initial 'MENU' screen 210 showing a list of submenus. Then, a 'MULTIMEDIA' 230 menu screen showing a list of a plurality of the multimedia submenus is displayed on the display 50. An 'MP3 player' menu 240, for example, is selected from the 'MULTIMEDIA' 230 menu screen. As a result, the mobile communication terminal 100 transitions to an 'MP3' 250 play mode and displays a list of MP3 files stored in the memory unit 20 on the display 50.

In the list of the MP3 files displayed on the display 50, the user moves a cursor to a desired MP3 file, for example, 'Dream Lover' 260, and selects a 'PLAY' menu 270 to play the selected MP3 file. Alternatively, the display 50 may be a touch screen and tapping on the name of the desired MP3 file, for example, 'Dream Lover' 260, will play the tapped file.

Figure 3:
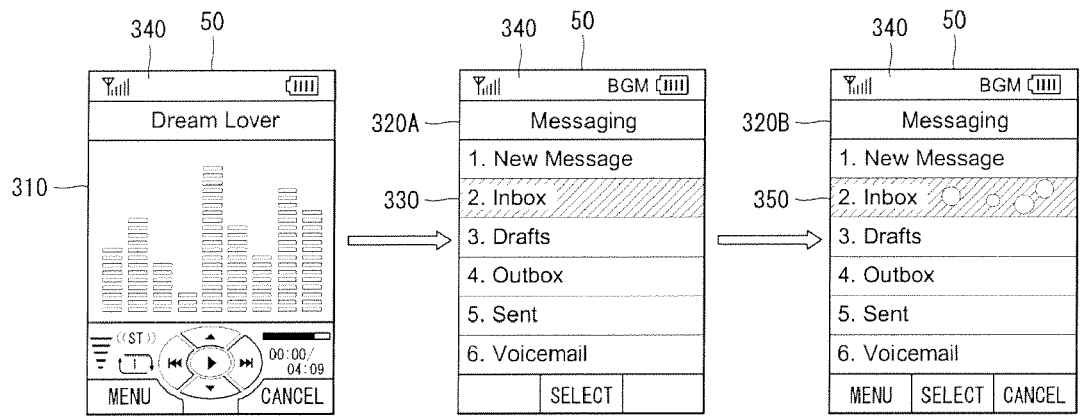

After the MP3 file is selected as described above in connection with FIG. 2, the display 50 displays a play screen 310, as shown in FIG. 3, to play the selected MP3 file. Referring to FIG. 3, the user may further request to perform another task while the MP3 file is being played.

Another task is then executed in the foreground while the MP3 file is being played in the background. For example, the user may request to enter a message mode by manipulating the input unit 30 while the MP3 file is being played as shown in the play screen 310. In response to the user's input, the mobile communication terminal 100 transitioned to the message mode to display a 'Messaging' menu screen 320A showing a list of message submenus such as 'New Message', 'Inbox', 'Drafts', and 'Outbox' on the foreground while the MP3 file is being played in the background.

On the displayed list of message submenus, a cursor 330 for selecting a desired menu is placed on one of the message submenus. The message menu screen 320A may display in an indicator area 340 a 'BGM' indicator to indicate that the MP3 file is being played in the background.

After a predetermined time lapses, for example 0.1 second, the message menu screen 320A may be changed into a modified screen 320B. In the modified screen 320B, the initial cursor 330 of the initial message menu screen 320A has been changed into an active cursor 350 having at least one graphic pattern displaying a rhythmical motion, for example, a pattern with polka dots in rhythmical movements.

Figure 4A:
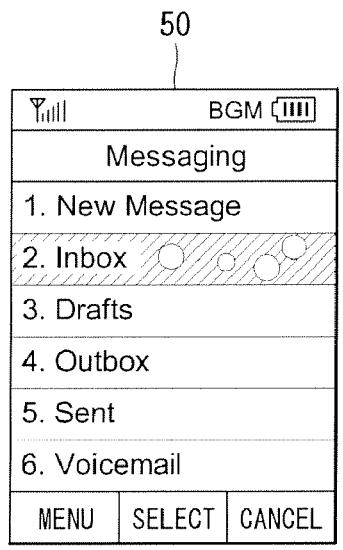
FIGS. 4A and 4B illustrate screens displaying active cursors according to an embodiment of the present invention.
Figure 4B:
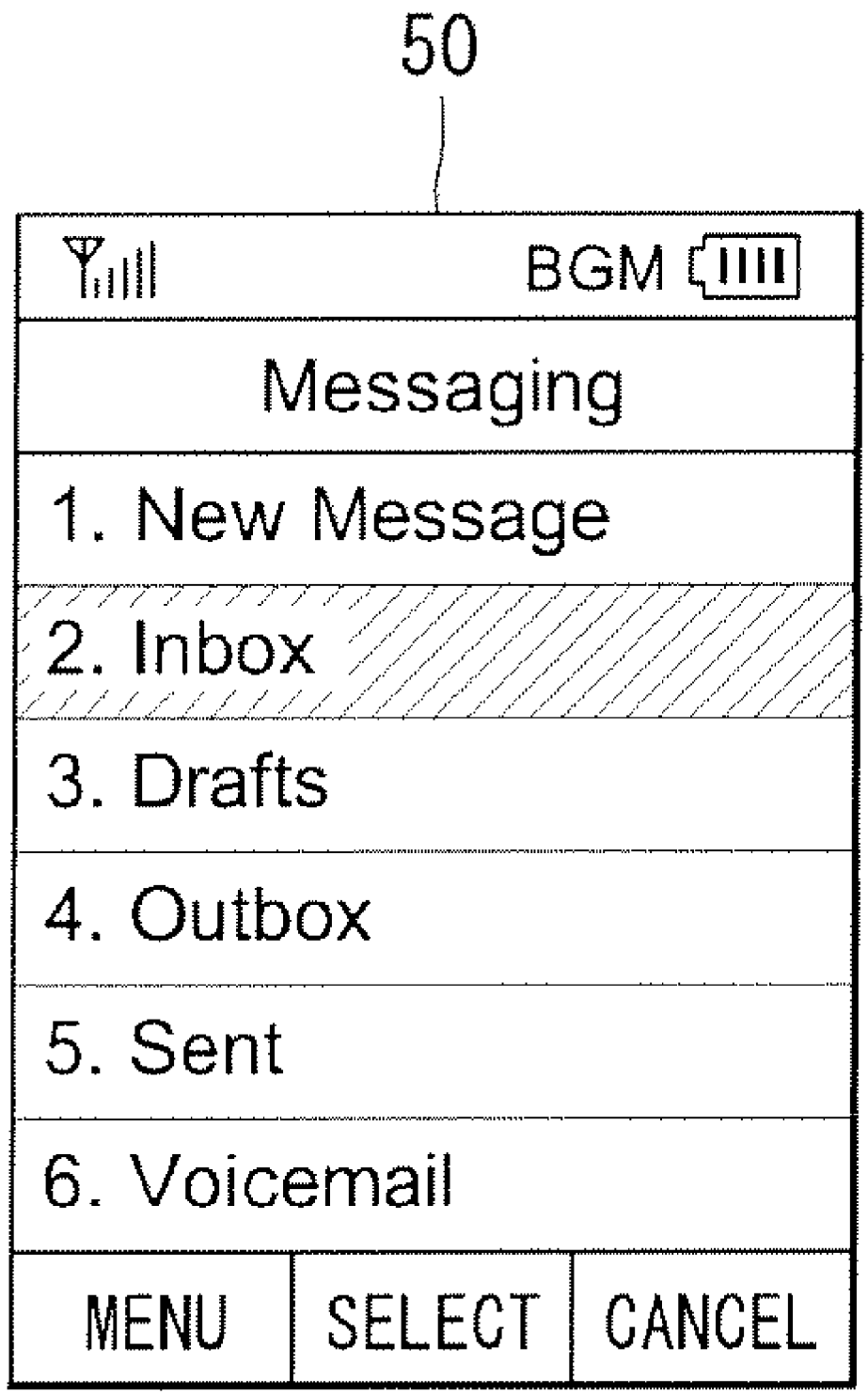

FIGS. 4A and 4B illustrate screens displaying examples of active cursors. As described above, the mobile communication terminal 100 may change the cursor 330 into the active cursor 350 having a specific pattern with rhythmic motions if the MP3 file is being played in the background while the multitask processing is performed. Therefore, from the specific pattern of the active cursor 350, the user may instantly notice that the MP3 file is being played in the background.

The described implementation is merely exemplary, and many variations may be applied to the implementation. For example, the active cursor 350 may be displayed to inform that a moving picture is being reproduced or a specific file is being downloaded in the background while another task is performed in the foreground.

According to the above description, the cursor 330 is displayed on the screen 320A for processing the new task and then changed into the active cursor 350 after the predetermined time has lapsed after initiating the multitask processing. Alternatively, the active cursor 350 may be displayed instantly upon initiating the new task and the screen 320B for the new task displayed on the display 50.

Figure 5:
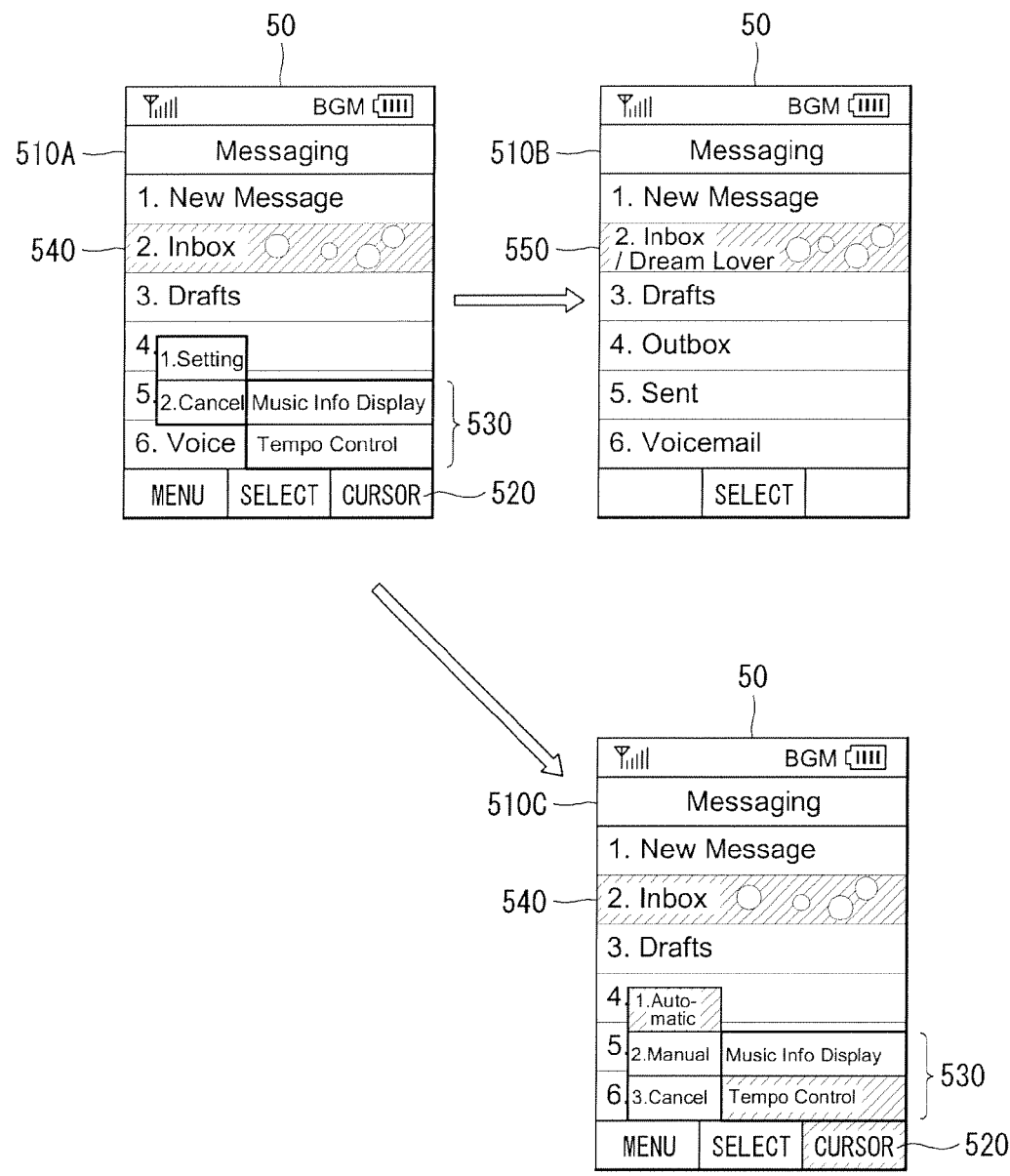
FIGS. 5 and 6 illustrate screens displaying active cursors according to another embodiment of the present invention.

Referring to FIG. 5, the mobile communication terminal 100 transitions to the message mode to display a message menu screen 510A while playing the MP3 file. The message menu screen 510A shows the list of message submenus with the active cursor 540 placed at one of the menus in the list.

If the user selects a 'CURSOR' menu 520 at a lower end of the message menu screen 510A under the list of the message submenus, a popup window 530 is displayed on the message menu screen 510A. The popup window 530 provides a 'Music information Display' menu and a 'Tempo Control' menu.

If the user places a cursor at the 'Music information Display' menu and presses a 'SELECT' menu on the left side of the 'CURSOR' menu 520, submenus, such as a 'Setting' and a 'Cancel' menu, are displayed in another popup window on the left side of the popup window 530. If the user selects the 'Setting' menu, the 'Messaging' menu screen 510A is turned into a screen 510B in which the active cursor 550 displays a name of the MP3 file being played within the active cursor 550. For example, 'Inbox/Dream Lover' is displayed within the active cursor 550 while the MP3 file of 'Dream Lover' is being played in the background.

If the user moves the cursor to the 'Tempo Control' menu in the popup window 530 and presses the 'SELECT' menu, submenus, such as an 'Automatic,' a 'Manual,' and a 'Cancel' menu, are displayed in another popup window on the left side of the popup window 530 on the message menu screen 510C. If the 'Automatic' menu is selected, a tempo of the motion of the pattern displayed within the active cursor 540 may be adjusted in accordance with a tempo of the MP3 file being reproduced. For example, the pattern may move in a faster tempo if the tempo of the MP3 file increases.

If the 'Manual' menu is selected, the user may set the tempo of the motion of the pattern in the active cursor 540 to one of available predetermined tempos and the tempo of the displayed motion will be constant regardless of the variation of the tempo in the MP3 file being played. For example, the predetermined tempo of the motion of the pattern may be available as 'very slow,' 'slow,' 'normal,' 'fast,' or 'very fast.'

If the user selects the 'Cancel' menu in the popup window 530, the pattern displayed in the active cursor 540 may move in a predetermined tempo set by the mobile communication terminal 100.

According to the above description, when the user selects the 'Music Info Display' menu, the name of the MP3 file is displayed within the active cursor 540. Alternatively, information regarding the MP3 file, such as lyrics, artist information or a play order of the MP3 files may be displayed within the active cursor 540.

Figure 6:
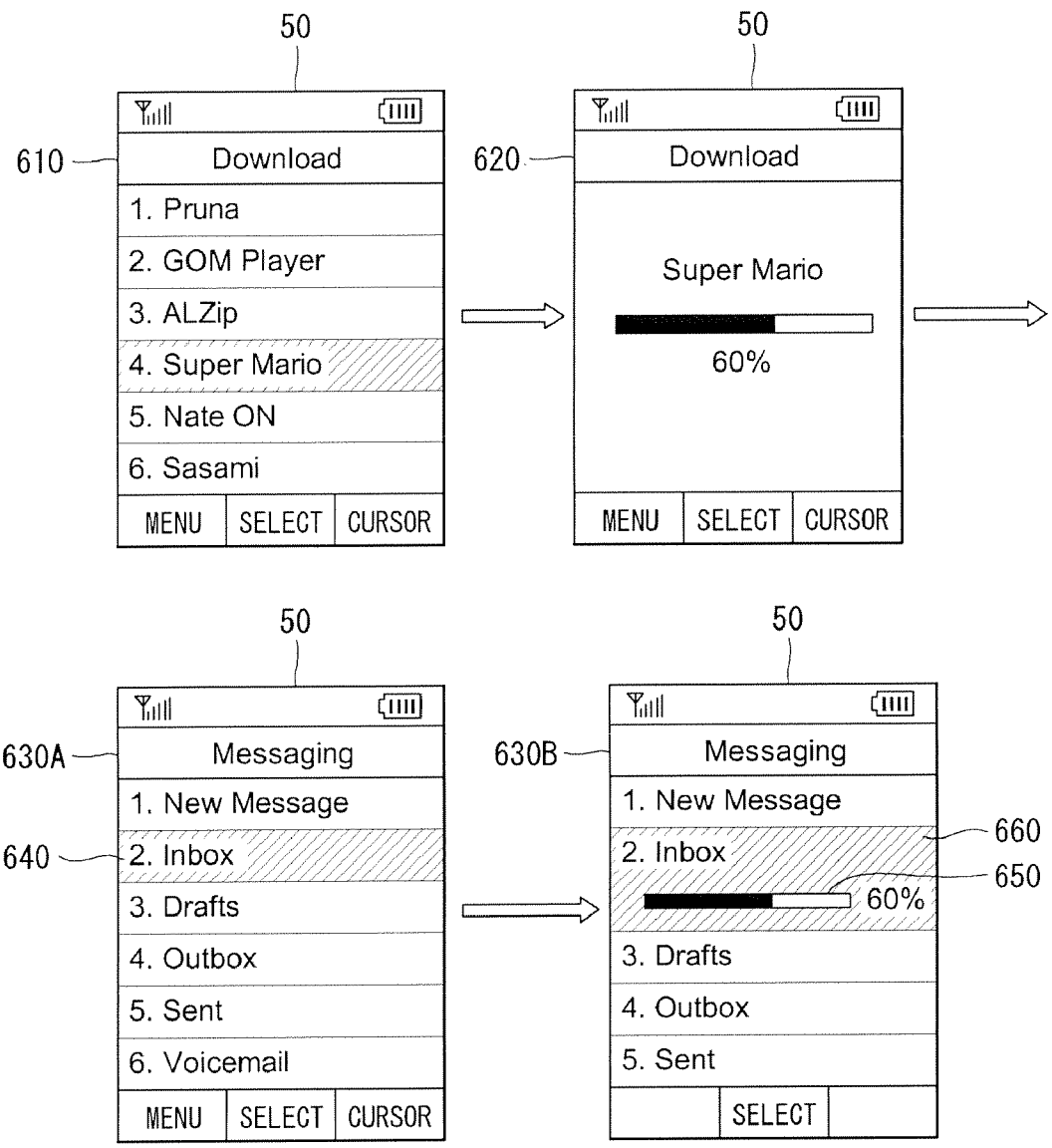

Referring to FIG. 6, if the user selects a connection to the Internet in order to download specific content, the display 50 displays a screen 610 showing a list of contents available for download. If the user moves the cursor to a desired content in the list and presses the 'SELECT' menu, the display 50 displays a screen 620 to indicate that the selected content is being downloaded.

If the user selects the message mode while the selected content is being downloaded, the mobile communication terminal 100 transitions to the message mode and displays a 'Messaging' menu screen 630A showing a list of message submenus in the foreground while downloading the desired content in the background. A cursor 640 may be placed on any one of the message submenus listed in the 'Messaging' menu screen 630A.

A progressive bar 650 may be displayed inside the cursor 660 after a predetermined time has lapsed, in a manner similar to screen 630B in order to show the progress of the download. Therefore, the user is able to check the progress of the download in the message mode.

As described above, the mobile communication terminal 100 may change the cursor 640 to display the progressive bar 650 within the cursor 660 after the predetermined time has lapsed. Alternatively, the cursor 660 may display the progressive bar 650 as soon as the message menu screen 630A is displayed in the foreground in response to the user's command.

Figure 7A:
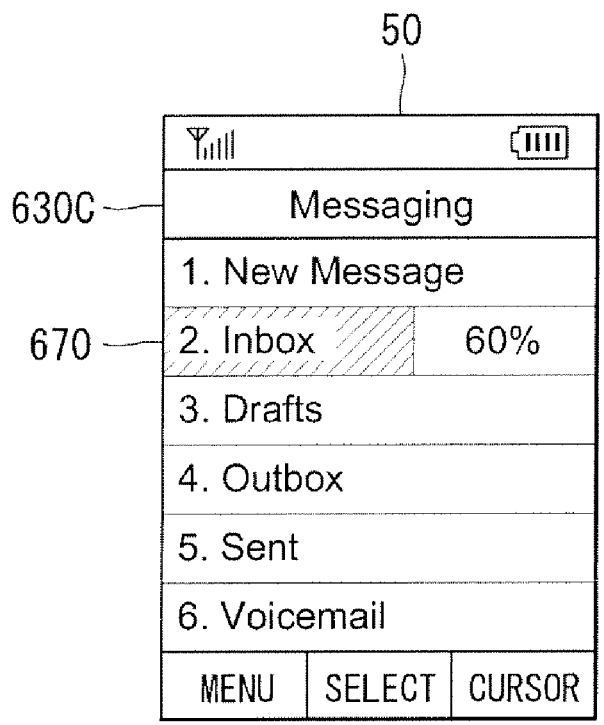
FIGS. 7A and 7B illustrate screens displaying active cursors according to yet another embodiment of the present invention.
Figure 7B:
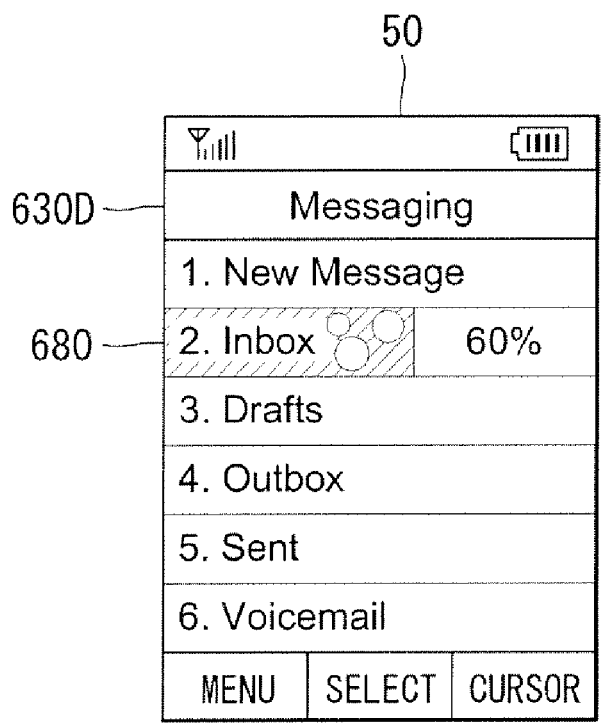

Further, rather than displaying the progressive bar 650 within the cursor 660, the cursor 670 itself may be implemented as a progressive bar to show the progress of the downloading as in a screen 630C shown in FIG. 7A. Furthermore, as illustrated by the cursor 680 displayed on a 'Messaging' menu screen 630D in FIG. 7B, the cursor 680 may be implemented as a progressive bar having a pattern with a rhythmical motion similar to that illustrated in FIGS. 3 and 4.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of multi-tasking in a mobile terminal, the method comprising:
   displaying a first task display associated with a first application task in the mobile terminal;
   receiving a request to execute a second application task while the first application task is being performed; and
   displaying a second task display comprising a menu list that is associated with the second application task,
   wherein the second task display further comprises an active cursor for identifying at least one item of the menu list, the active cursor indicating progress or status information associated with the first application task that is being performed when the at least one item associated with the second application task is selected from the menu list, and wherein the menu list is not associated with the first application task.

2. The method of claim 1, wherein the active cursor comprises at least one of color, color tone and fading.

3. The method of claim 1, wherein the active cursor comprises at least one of still and moving images.

4. The method of claim 3, wherein the first application task comprises an MP3 file reproduction function and the moving images move in response to a tempo of music played via the MP3 file reproduction function.

5. The method of claim 1, wherein the active cursor comprises at least one display feature that corresponds to at least one additional application task being performed concurrently with the first and the second application tasks.

6. The method of claim 5, wherein the at least one display feature is selectively determined by the user.

7. The method of claim 1, wherein the status information comprises one of text information and a progressive bar graph.

8. The method of claim 1, wherein the active cursor is initiated a predetermined time after displaying the second task display.

9. A terminal comprising:
   an input unit for receiving a request to perform a first application task and a request to perform a second application task, the request to perform the second application task received while the first application task is being performed;
   a display for displaying a first task display associated with the first application task and a second task display associated with the second application task, the second task display comprising a menu list that is associated with the second application task and an active cursor identifying at least one item of the menu list; and
   a controller for causing displaying of the active cursor on the at least a one item of the menu list, the active cursor indicating progress or status information associated with the first application task that is being performed when the at least one item associated with the second application task is selected from the menu list,
   wherein the menu list is not associated with the first application task.

10. The terminal of claim 9, wherein the active cursor comprises at least one of color, color tone and fading.

11. The terminal of claim 9, wherein the active cursor comprises at least one of still and moving images.

12. The terminal of claim 11, wherein the first application task comprises an MP3 file reproduction function and the moving images move in response to a tempo of music played via the MP3 file reproduction function.

13. The terminal of claim 9, wherein the active cursor comprises at least one display feature that corresponds to at least one additional application task being concurrently performed with the first and the second application tasks.

14. The terminal of claim 13, wherein the at least one display feature is selectively determined by the user.

15. The terminal of claim 9, wherein the status information comprises one of text information and a progressive bar graph.

16. The terminal of claim 9, wherein the active cursor is initiated a predetermined time after displaying the second task display.

17. A method of controlling multi-tasking in a mobile terminal, the method comprising:

displaying a first task display associated with a first application task at a display of the mobile terminal;

receiving a request to execute a second application task while the first application task is being performed;

displaying a second task display in response to the request, the second task display comprising a menu list including the second application task and a cursor for selecting at least one menu item in the menu list;

converting the cursor into an active cursor when selecting the second application task from the menu list, the active cursor identifying the selected second application task and indicating progress or status information associated with the first application task that is being performed; and executing the selected second application and the first application concurrently.

\* \* \* \* \*